UNITED STATES PATENT OFFICE.

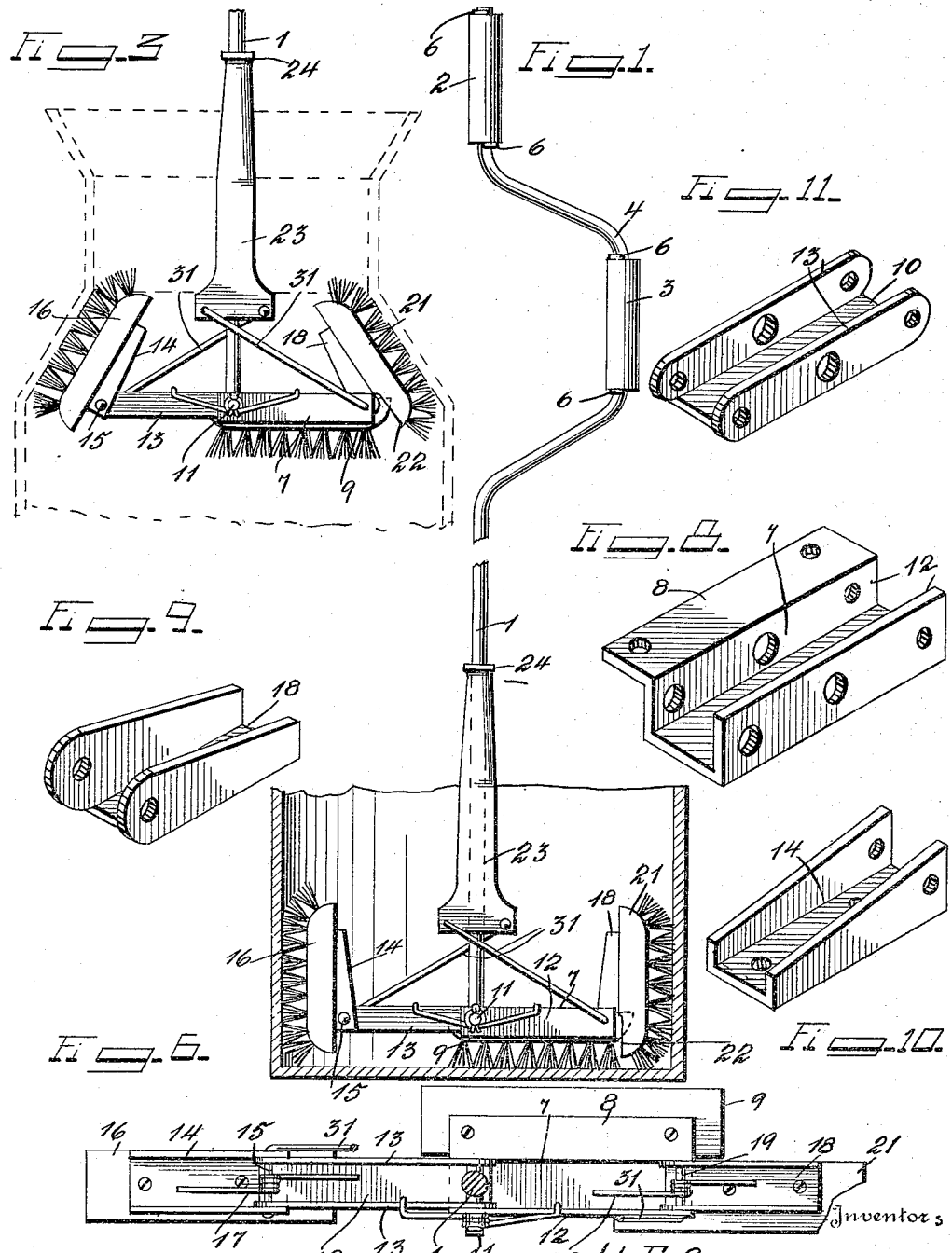

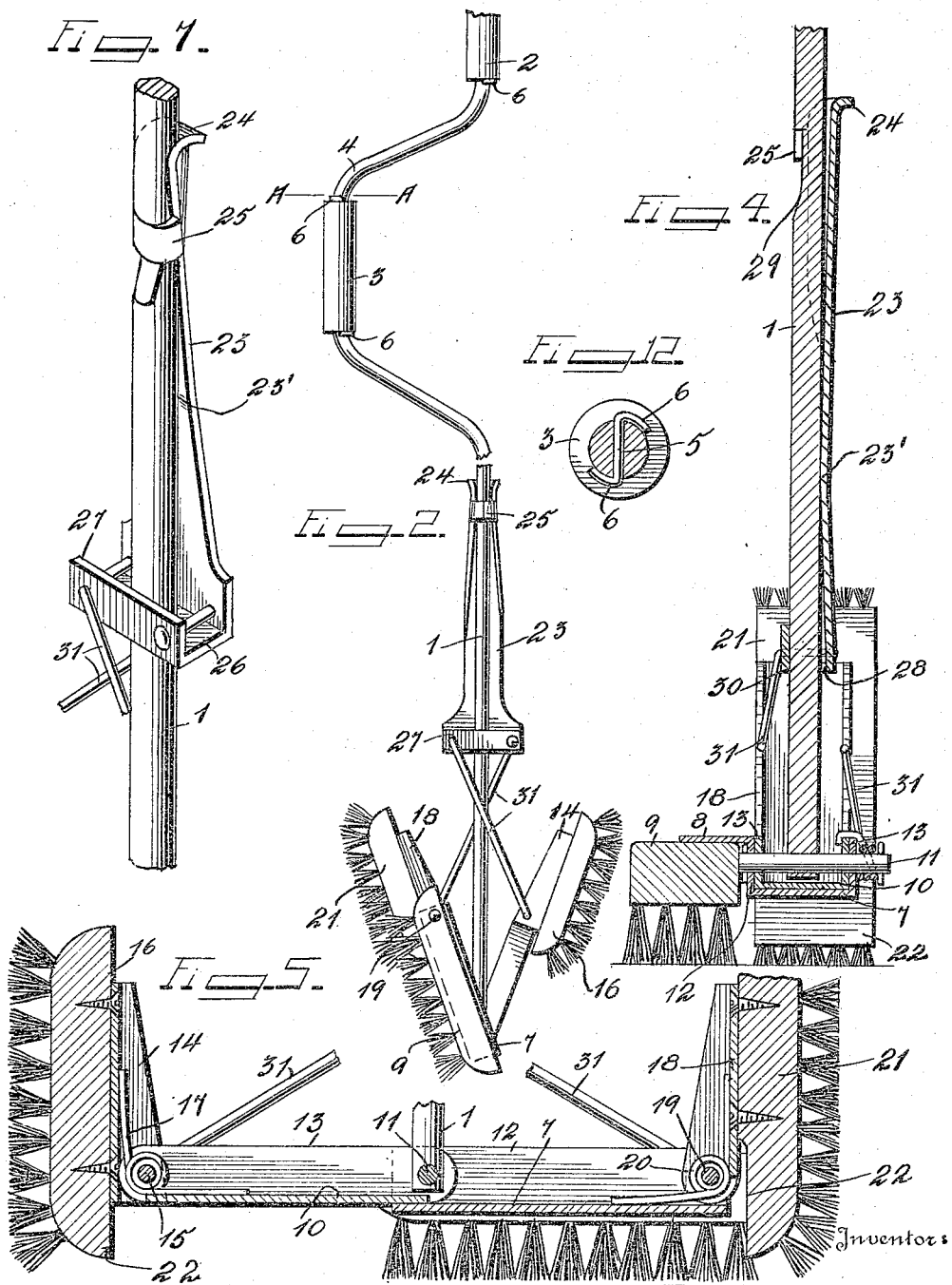

HENRY E. SCHOEPHOERSTER AND FREDERICK RODER, OF SUMNER, IOWA.

MILK-CAN WASHER.

1,171,070.   Specification of Letters Patent.   Patented Feb. 8, 1916.

Application filed March 3, 1915. Serial No. 11,755.

*To all whom it may concern:*

Be it known that we, HENRY E. SCHOEPHOERSTER and FREDERICK RODER, citizens of the United States of America, residing at Sumner, in the county of Bremer and State of Iowa, have invented certain new and useful Improvements in Milk-Can Washers, of which the following is a specification, reference being had therein to the accompanying drawing.

This invention relates to milk can washers, and has for its object the production of a simple and efficient washer wherein the brushes may easily turn or swing to conform to the contour of the interior of the milk can or other receptacle which is desired to be washed.

Another object of this invention is the production of a simple and efficient means for locking the brushes in an extended position after the same have been forced into a milk can or other receptacle.

With these and other objects in view this invention consists of certain novel combinations, constructions, and arrangements of parts as will be hereinafter fully described and claimed.

In the accompanying drawings:—Figure 1 is a side elevation of the washer showing the brushes in their respective positions for washing the bottom of a milk can or other receptacle. Fig. 2 is a side elevation of the washer looking at the opposite side from that shown in Fig. 1 with the brushes in a retracted position. Fig. 3 is a side elevation of the lower end of the washing device showing the relative position of the brushes for washing the upper end of a milk can. Fig. 4 is a central vertical section through the washer. Fig. 5 is an enlarged longitudinal section through the brush frame. Fig. 6 is a top plan view of the brush frame showing the operating standard in cross-section. Fig. 7 is a detail perspective of the brush controlling slide carried by the main standard. Fig. 8 is a detail perspective of the channel plate for supporting the bottom brush. Fig. 9 is a detail perspective of one of the end brush supporting channel plates. Fig. 10 is a detail perspective of the opposite end brush supporting channel plate. Fig. 11 is a detail perspective of the connecting link for supporting one of the end brushes. Fig. 12 is a section taken on line A—A of Fig. 2.

By referring to the drawings it will be seen that 1 designates the crank handle which is provided with a hand grip 2 at its upper end, and carries a loosely mounted sleeve 3 upon the crank portion 4 of the crank handle 1. It will be seen that the sleeve 3 is held against longitudinal movement, as is also the handle 2 by means of the transversely extending pins 5 which have their opposite ends 6 bent to lie snugly around the crank handle 1 as clearly illustrated in Fig. 12.

A bottom brush supporting channel plate 7 is pivotally secured to the lower end of the crank handle 1, and this bottom brush supporting channel plate is provided with a laterally extending flange 8 which fits over the back of the bottom brush 9 as clearly illustrated in Fig. 4 for the purpose of efficiently attaching the brush thereto. An attaching link 10 is pivotally secured to the crank 1 by means of a pivot pin 11, which pivot pin also constitutes a connecting means for the brush supporting plate 7 for facilitating the upward swinging movement of the link 10 and also the brush supporting plate 7 when so desired. The brush supporting plate 7 is provided with a pair of parallel side flanges 12, and the link 10 is also provided with a pair of parallel side flanges 13, the inner ends of the brush supporting plate 7 and the link 13 interlocking as clearly illustrated in Fig. 6.

A brush supporting channel plate 14 is pivotally secured to the outer end of the link 10 by means of a pivot pin 15, and an end brush 16 is secured to the plate 14 as clearly illustrated in Fig. 5. A coil spring 17 is wound around the pivot pin 15 and has its respective ends engaging the link 10 and plate 14 for normally retaining the brush 16 horizontal with the link 10, but at the same time allowing the brush to swing at right angles, or in other words to the position shown in Fig. 5.

An additional end brush supporting plate 18 is pivotally mounted between the outer ends of the brush supporting plate 7 by means of a pivot pin 19. A coil spring 20 is wound upon the pivot pin 19 and has its respective ends engaging the plate 7 and the channel plate 18 for normally urging the brush 21 to a position extending horizontal with the brush supporting plate 7. Each of the brushes 16 and 21 is provided with a projecting inner end 22 which is adapted to limit the downward swing of the brushes when brought to a horizontal position by means of the respective springs 17 and 20.

The main crank 1 carries a slidably mounted brush controlling slide 23 which is provided with an overhanging finger gripping portion 24. The slide 23 is also provided with inwardly curved ears 25 for fitting snugly around the crank 1 and constituting a guide for the slide 23. The slide 23 is provided with a laterally extending lower end 26, which laterally extending end terminates in an upwardly extending flange portion 27. The crank 1 passes through an aperture formed in the laterally extending flange 26, and in this manner will facilitate the sliding of the slide 23 longitudinally of the crank 1. The crank 1 is provided with a notch portion 29 upon one side thereof for the purpose of allowing the curved ears 25 to fit therein and be locked against upward sliding movement while the brush is being operated or is in the position shown in Fig. 1. The slide 23 is provided with an inwardly inclined portion 23′ intermediate its ends for engaging the sides of the crank 1 and normally urging the ears 25 in engagement with the notch 29. It will, therefore, be seen that the slide may be easily moved along the crank 1 by forcing the finger piece 24 inwardly to first remove the ears from the notch 29 and then move the slide longitudinally of the crank 1.

A pair of oppositely extending links 31 are connected to the lower end of the slide 23 and extend upon opposite sides of the crank 1 as illustrated in Fig. 2. These links 31 are connected at their lower ends to the respective pivot ears 15 and 19 for the purpose of facilitating the drawing of the brushes and brush frame to the position shown in Fig. 2 when the slide 23 is moved upwardly for the purpose of removing the brushes from a can or other receptacle which is being washed thereby.

From the foregoing description it will be seen that a very simple and efficient device has been produced for the purpose of washing milk cans and the like, and it should be understood that by drawing the brush frame to the position shown in Fig. 3, the upper end of the milk can or other receptacle of like nature may be readily washed owing to the fact that the end brush channel plates 14 and 18 are pivotally and yieldably mounted upon the link 10 and the brush carrying plate 7. It should be further understood that the brushes may be firmly held in engagement with the inner face of the can by moving the slide 23 downwardly so as to lock the same in the position shown in Figs. 4 and 5.

It should be understood that if so desired any suitable cleaning powder may be first inserted into the can with sufficient water and the brushes may then be inserted and operated for the purpose of thoroughly cleaning the interior of the can. The can may then be rinsed and be ready for receiving the milk or other material desired to be placed therein.

It should be understood that any detail or minor changes may be employed without departing from the spirit of the invention so long as the device produced falls within the scope of the appended claims.

Having thus described the invention what is claimed as new, is:—

1. A can washer of the class described comprising a crank handle, a channel plate, a bottom brush carried by said channel plate, said channel plate provided with a laterally extending flange for fitting snugly over said bottom brush, an attaching link pivotally secured to said crank handle and to said channel plate, said link being adapted to be swung upwardly, a brush supporting plate pivotally secured to said link, said brush supporting plate provided with a pair of parallel sides, a coiled spring carried by said link and engaging said brush supporting plate for normally holding said brush supporting plate in line with said link, a second brush carrying plate secured to the outer end of said channel plate, means for normally urging said second brush carrying plate to extend in alinement with said channel plate, a slide mounted upon said crank handle, links connecting said channel plate and said first-mentioned link to the lower end of said slide, and means for holding said slide against upward movement.

2. A can washer of the class described comprising a crank handle, a channel plate, a bottom brush carried by said channel plate, said channel plate provided with a laterally extending flange for fitting snugly over said bottom brush, an attaching link pivotally secured to said crank handle and to said bottom brush, said link being adapted to be swung upwardly, a brush supporting plate pivotally secured to said link, said brush supporting plate provided with a pair of parallel sides, a coiled spring carried by said link and engaging said brush supporting plate for normally holding said brush supporting plate in line with said link, a second brush carrying plate secured to the outer end of said channel plate, means for normally urging said second brush carrying plate to extend in alinement with said channel plate, a slide mounted upon said crank handle, links connecting said channel plate and said first-mentioned link to the lower end of said slide, and means for holding said slide against upward movement, a finger grip carried by said slide for facilitating the reciprocation of said slide upon said crank handle for swinging said brushes with respect to said crank handle, whereby said brushes may be yieldably held in engagement with each other by the inner face of a can adapted to be cleaned, said slide provided with a plurality of inwardly bent ears, said crank handle provided with a notch formed therein, and said ears adapted to engage said notched portion for limiting the upward sliding movement of said slide upon said crank handle.

In testimony whereof we hereunto affix our signatures in presence of two witnesses.

HENRY E. SCHOEPHOERSTER.
FREDERICK RODER.

Witnesses:
W. O. HEYER,
P. M. SORG.

Copies of this patent may be obtained for five cents each, by addressing the "Commissioner of Patents, Washington, D. C."